(12) United States Patent
Koike et al.

(10) Patent No.: US 11,110,526 B2
(45) Date of Patent: Sep. 7, 2021

(54) CUTTING INSERT

(71) Applicant: SUMITOMO ELECTRIC HARDMETAL CORP., Itami (JP)

(72) Inventors: Yusuke Koike, Itami (JP); Yasuyuki Kanada, Itami (JP); Atsuhiko Maeta, Itami (JP); Tomoyuki Fukuyama, Itami (JP); Yoshinari Nagami, Itami (JP); Yuta Morisaki, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 16/463,803

(22) PCT Filed: Nov. 30, 2017

(86) PCT No.: PCT/JP2017/042999
§ 371 (c)(1),
(2) Date: May 23, 2019

(87) PCT Pub. No.: WO2018/123421
PCT Pub. Date: Jul. 5, 2018

(65) Prior Publication Data
US 2019/0283148 A1    Sep. 19, 2019

(30) Foreign Application Priority Data
Dec. 27, 2016  (WO) .................. PCT/JP2016/088913

(51) Int. Cl.
*B23C 5/06*    (2006.01)
*B23C 5/22*    (2006.01)
*B23C 5/20*    (2006.01)

(52) U.S. Cl.
CPC .................. *B23C 5/06* (2013.01); *B23C 5/20* (2013.01); *B23C 5/2221* (2013.01); *B23C 2200/208* (2013.01); *B23C 2210/168* (2013.01)

(58) Field of Classification Search
CPC ....... B23C 2200/0411; B23C 2200/205; B23C 2200/208; B23C 2200/28; B23C 5/06;
(Continued)

(56) References Cited

U.S. PATENT DOCUMENTS 4,572,042 A * 2/1986 Wiman .................. B23B 27/141
407/113
5,437,522 A * 8/1995 Satran ................... B23C 5/2213
407/114
(Continued)

FOREIGN PATENT DOCUMENTS

DE     19702182 A1 * 7/1998 ........... B23B 27/141
EP     1270122 A1    1/2003
(Continued)

*Primary Examiner* — Nicole N Ramos
(74) *Attorney, Agent, or Firm* — Baker Botts L.L.P.; Michael A. Sartori

(57) ABSTRACT

A cutting insert according to the present disclosure includes a first surface, a second surface, a side surface, and a cutting edge. The first surface has a rake face continuous to the cutting edge. The cutting edge has a corner cutting edge, a flat cutting edge, and a main cutting edge. The rake face has a first rake face portion, a second rake face portion, and a third rake face portion, the first rake face portion being continuous to the flat cutting edge, the second rake face portion being continuous to the main cutting edge, the third rake face portion being continuous to the corner cutting edge and being located between the first rake face portion and the second rake face portion. The rake face is provided with a level difference portion.

6 Claims, 8 Drawing Sheets

(58) Field of Classification Search
CPC . B23C 5/207; B23C 2210/082; Y10T 407/23; Y10T 407/235
See application file for complete search history.

(56) References Cited

U.S. PATENT DOCUMENTS

| | | | | |
|---|---|---|---|---|
| 8,915,681 | B2* | 12/2014 | Ishi | B23C 5/06 409/132 |
| 9,370,832 | B2* | 6/2016 | Kurokawa | B23B 27/1659 |
| 2003/0002931 | A1 | 1/2003 | Popke | |
| 2007/0071559 | A1* | 3/2007 | Koskinen | B23B 27/16 407/34 |
| 2008/0232912 | A1* | 9/2008 | Bhagath | B23C 5/06 407/114 |
| 2008/0304924 | A1* | 12/2008 | Engstrom | B23C 5/202 407/114 |
| 2010/0129167 | A1 | 5/2010 | Morrison | |
| 2012/0070240 | A1* | 3/2012 | Ishi | B23C 5/06 407/42 |
| 2012/0189396 | A1 | 7/2012 | Xu | |
| 2013/0094913 | A1* | 4/2013 | Yoshida | B23C 5/06 407/42 |
| 2013/0336732 | A1* | 12/2013 | Jansson | B23C 5/207 407/47 |
| 2014/0076117 | A1* | 3/2014 | Shibata | B23C 5/2221 83/13 |
| 2016/0256941 | A1* | 9/2016 | Brunetto | B23C 5/207 |
| 2016/0375506 | A1 | 12/2016 | Koike et al. | |

FOREIGN PATENT DOCUMENTS

| | | | |
|---|---|---|---|
| JP | S62-085319 U | | 5/1987 |
| JP | 2001009628 A | * | 1/2001 |
| JP | 2001-269808 A | | 10/2001 |
| JP | 2006-082168 A | | 3/2006 |
| JP | 2015-186827 A | | 10/2015 |
| WO | 2008/132757 A1 | | 11/2008 |
| WO | 2015/174200 A1 | | 11/2015 |

* cited by examiner

US 11,110,526 B2

CUTTING INSERT

TECHNICAL FIELD

The present disclosure relates to a cutting insert. The present application claims a priority based on International Patent Application PCT/JP2016/088913 filed on Dec. 27, 2016, the entire content of which is incorporated herein by reference.

BACKGROUND ART

WO 2015/174200 (Patent Literature 1) describes a cutting insert for milling. The cutting insert described in Patent Literature 1 has a main cutting edge and a rake face continuous to the main cutting edge. In the cutting insert described in Patent Literature 1, an inclination angle of the rake face relative to the main cutting edge is substantially constant in the extending direction of the main cutting edge.

CITATION LIST

Patent Literature

PTL 1: WO 2015/174200

SUMMARY OF INVENTION

A cutting insert according to the present disclosure includes: a first surface; a second surface opposite to the first surface; a side surface continuous to both the first surface and the second surface; and a cutting edge constituted of a ridgeline between the first surface and the side surface. The first surface has a rake face continuous to the cutting edge. The cutting edge has a corner cutting edge, a flat cutting edge continuous to a first end portion of the corner cutting edge, and a main cutting edge continuous to a second end portion of the corner cutting edge opposite to the first end portion of the corner cutting edge. The rake face has a first rake face portion, a second rake face portion, and a third rake face portion, the first rake face portion being continuous to the flat cutting edge, the second rake face portion being continuous to the main cutting edge, the third rake face portion being continuous to the corner cutting edge and being located between the first rake face portion and the second rake face portion. The rake face is provided with a level difference portion at the second rake face portion or the third rake face portion, the level difference portion extending in a direction crossing the main cutting edge. The level difference portion is constituted of a rising surface, a first region, and a second region, the first region being adjacent to the rising surface at a side close to the corner cutting edge, the second region being adjacent to the rising surface at a side far from the corner cutting edge. The rising surface rises from the first region and is continuous to the second region. The main cutting edge includes a first main cutting edge portion, a second main cutting edge portion, and a third main cutting edge portion continuous to the corner cutting edge. The first main cutting edge portion is continuous to the third main cutting edge portion at a first boundary portion, rises from the first boundary portion, and is continuous to the second main cutting edge portion at a second boundary portion.

DETAILED DESCRIPTION

Figure 1:
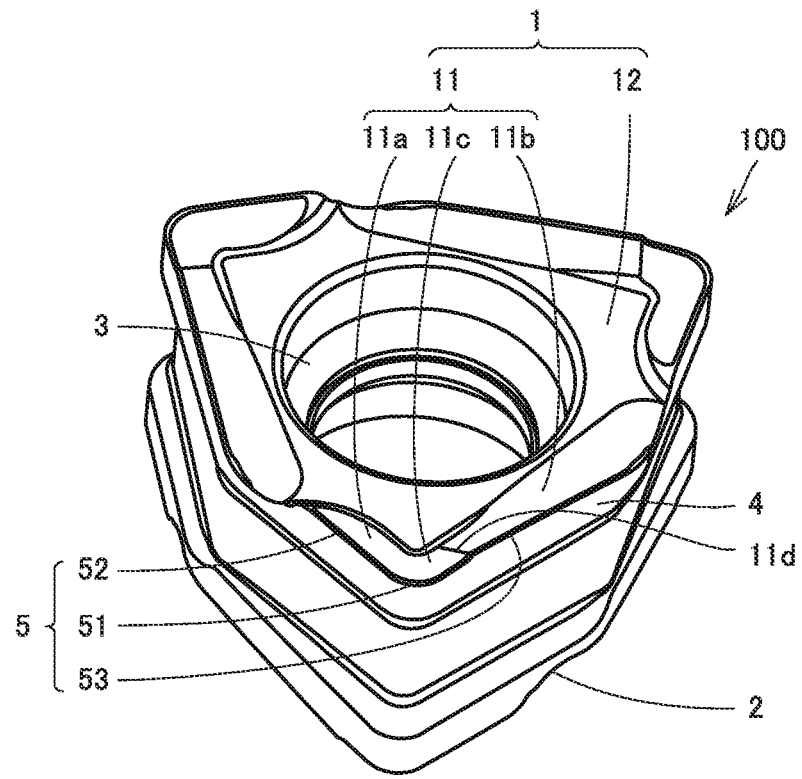
FIG. 1 is a perspective view of a cutting insert according to a first embodiment.

Problem to be Solved by the Present Disclosure

When cutting a workpiece using the cutting insert described in Patent Literature 1, a scratch mark may remain in a processed surface of the workpiece. The present disclosure provides a cutting insert for suppressing a scratch mark from remaining in a processed surface of a workpiece.

Advantageous Effect of the Present Disclosure

According to the cutting insert according to the present disclosure, a scratch mark can be suppressed from remaining in a processed surface of a workpiece.

Description of Embodiments

First, the following describes the summary of embodiments of the present disclosure.

(1) A cutting insert according to the present disclosure includes: a first surface; a second surface opposite to the first surface; a side surface continuous to both the first surface and the second surface; and a cutting edge constituted of a ridgeline between the first surface and the side surface. The first surface has a rake face continuous to the cutting edge. The cutting edge has a corner cutting edge, a flat cutting edge (wiper) continuous to a first end portion of the corner cutting edge, and a main cutting edge continuous to a second end portion of the corner cutting edge opposite to the first end portion of the corner cutting edge. The rake face has a first rake face portion, a second rake face portion, and a third rake face portion, the first rake face portion being continuous to the flat cutting edge, the second rake face portion being continuous to the main cutting edge, the third rake face portion being continuous to the corner cutting edge and being located between the first rake face portion and the second rake face portion. The rake face is provided with a level difference portion at the second rake face portion or the third rake face portion, the level difference portion extending in a direction crossing the main cutting edge. The level difference portion is constituted of a rising surface, a first region, and a second region. The first region is adjacent to the rising surface at a side close to the corner cutting edge. The second region is adjacent to the rising surface at a side far from the corner cutting edge. The rising surface rises from the first region and is continuous to the second region. The main cutting edge includes a first main cutting edge portion, a second main cutting edge portion, and a third main cutting edge portion continuous to the corner cutting edge. The first main cutting edge portion is continuous to the third main cutting edge portion at a first boundary portion, rises from the first boundary portion, and is continuous to the second main cutting edge portion at a second boundary portion.

According to the cutting insert according to (1), a scratch mark can be suppressed from remaining in a processed surface of a workpiece.

(2) In the cutting insert according to (1), when viewed in a direction perpendicular to the side surface continuous to the main cutting edge, the second end portion may have a height lower than a height of the second boundary portion.

According to the cutting insert according to (2), a scratch mark can be suppressed from remaining in a processed surface of a workpiece.

(3) In the cutting insert according to (1), the level difference portion may cross the main cutting edge. According to the cutting insert according to (3), a scratch mark can be further suppressed from remaining in a processed surface of a workpiece.

(4) In the cutting insert according to (1), the level difference portion may not cross the main cutting edge. According to the cutting insert according to (4), roughness can be suppressed in a processed surface of a workpiece.

(5) In the cutting insert according to any one of (1) to (4), an angle formed by an extending direction of the main cutting edge and an extending direction of the level difference portion may be more than or equal to 1° and less than or equal to 90° when viewed in a plan view.

According to the cutting insert according to (5), a scratch mark can be further suppressed from remaining in a processed surface of a workpiece.

(6) In the cutting insert according to any one of (1) to (5), the main cutting edge may include a first portion and a second portion. The first portion is located at the second end portion side. The second portion is located opposite to the second end portion, and is curved to be further away from an extension line of the first portion as the second portion is further away from the first portion. A distance between the flat cutting edge and the level difference portion may be less than or equal to 0.5 time as large as a distance between the flat cutting edge and an end of the first portion at the second portion side.

According to the cutting insert according to (6), a scratch mark can be further suppressed from remaining in a processed surface of a workpiece.

Details of Embodiment of the Present Disclosure

Next, the following describes details of embodiments of the present disclosure with reference to figures. It should be noted that in the below-mentioned figures, the same or corresponding portions are given the same reference characters and are not described repeatedly.

First Embodiment

The following describes a configuration of a cutting insert 100 according to a first embodiment.

Figure 2:
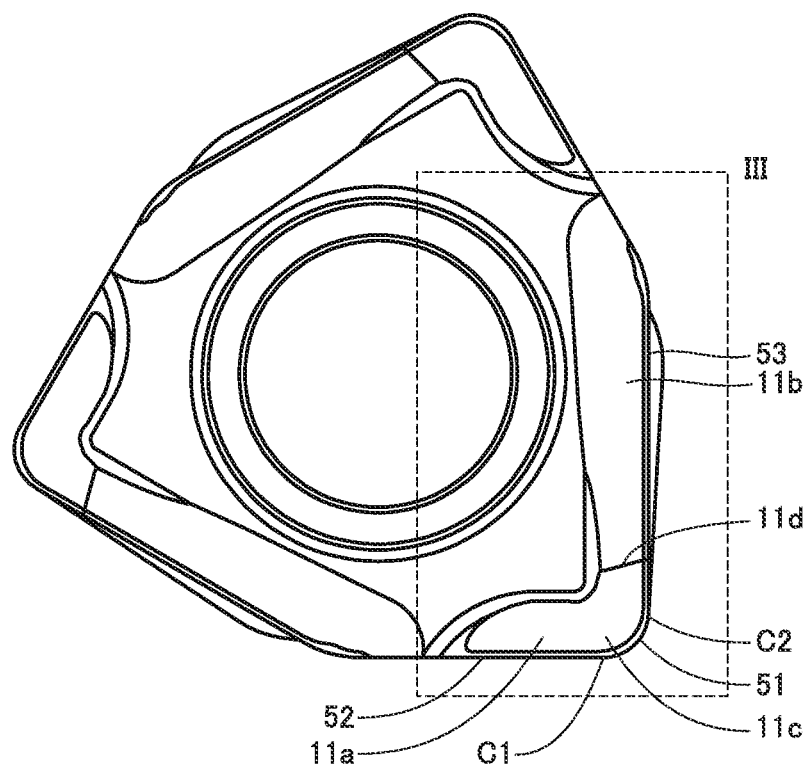
FIG. 2 is a plan view of the cutting insert according to the first embodiment.
Figure 3:
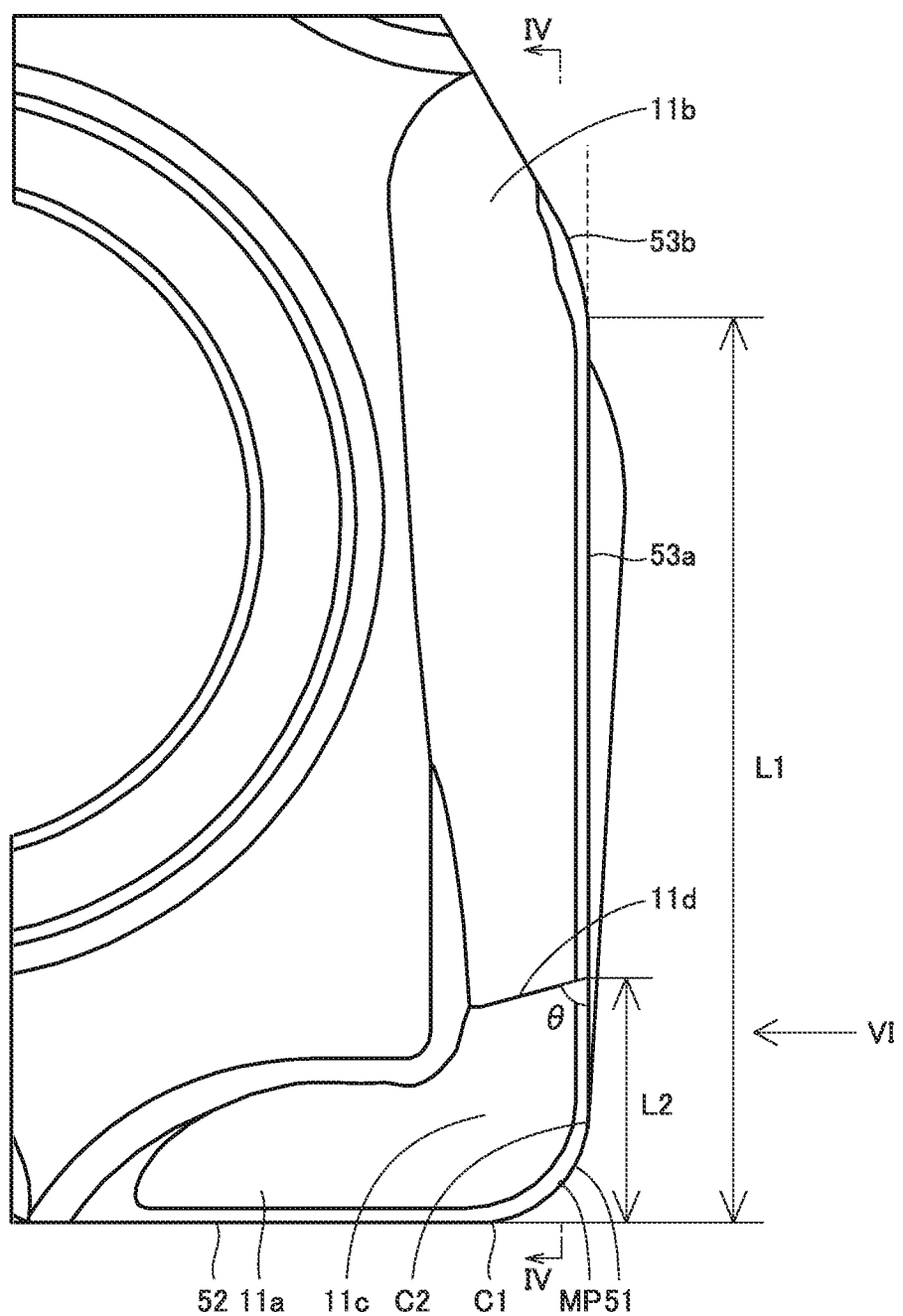
FIG. 3 is an enlarged plan view of a region III of FIG. 2.

FIG. 1 is a perspective view of the cutting insert according to the first embodiment. FIG. 2 is a plan view of the cutting insert according to the first embodiment. FIG. 3 is an enlarged plan view of a region III of FIG. 2.

As shown in FIG. 1 to FIG. 3, cutting insert 100 according to the first embodiment may have a first surface 1, a second surface 2, a through hole 3, a side surface 4, and a cutting edge 5.

Second surface 2 is a surface opposite to first surface 1. Each of first surface 1 and second surface 2 has a substantially polygonal shape (substantially hexagonal shape) having right-angle corners (or acute angle corners) and obtuse angle corners arranged alternately.

First surface 1 has a rake face 11 and a seat face 12. Rake face 11 is continuous to cutting edge 5 described below. Seat face 12 is located opposite to cutting edge 5 relative to rake face 11. Seat face 12 has a flat shape.

Through hole 3 extends through cutting insert 100 according to the first embodiment in a direction from first surface 1 toward second surface 2.

Side surface 4 is continuous to both first surface 1 and second surface 2. Cutting edge 5 is constituted of a ridgeline between first surface 1 and side surface 4. Cutting edge 5 is provided at each of three corners of first surface 1 having a substantially hexagonal shape, for example.

Cutting edge 5 has a corner cutting edge 51, a flat cutting edge (wiper) 52, and a main cutting edge 53. Corner cutting edge 51 is disposed at a rounded nose portion of first surface 1. Corner cutting edge 51 has a first end portion C1 and a second end portion C2. When viewed in a plan view, at each of first end portion C1 and second end portion C2, the shape of cutting edge 5 is changed from the form of a curve to the form of a straight line. Second end portion C2 is located opposite to first end portion C1. Flat cutting edge 52 is continuous to corner cutting edge 51 at first end portion C1. Main cutting edge 53 is continuous to corner cutting edge 51 at second end portion C2.

Main cutting edge 53 has a first portion 53a and a second portion 53b. First portion 53a is a portion of main cutting edge 53 located at the second end portion C2 side. A distance L1 represents a distance between flat cutting edge 52 and the end of first portion 53a opposite to second end portion C2 (the end of first portion 53a at the second portion 53b side).

Second portion 53b is a portion of main cutting edge 53 located opposite to second end portion C2. As second portion 53b is further away from first portion 53a, second portion 53b is curved to be further away from the extension line (indicated by a dotted line in FIG. 3) of first portion 53a.

Rake face 11 has a first rake face portion 11a, a second rake face portion 11b, and a third rake face portion 11c. First rake face portion 11a is continuous to flat cutting edge 52. Second rake face portion 11b is continuous to main cutting edge 53. Third rake face portion 11c is continuous to corner cutting edge 51. Third rake face portion 11c is disposed between first rake face portion 11a and second rake face portion 11b.

A level difference portion 11d is provided at rake face 11. Level difference portion 11d is provided at second rake face portion 11b or third rake face portion 11c. Level difference portion 11d extends in a direction crossing main cutting edge 53. Level difference portion 11d may cross main cutting edge 53. Level difference portion 11d may not cross main cutting edge 53.

When viewed in a plan view, an angle θ is formed between the extending direction of main cutting edge 53 and the extending direction of level difference portion 11d. Angle θ is preferably more than or equal to 1° and less than or equal to 90°. Angle θ is more preferably more than or equal to 45° and less than or equal to 90°.

It should be noted that the expression "angle θ is more than or equal to 1° and less than or equal to 90° (more than or equal to 45° and less than or equal to 90°)" indicates a state that the extending direction of level difference portion 11d is turned clockwise at more than or equal to 1° and less than or equal to 90° (more than or equal to 45° and less than or equal to 90°) relative to main cutting edge 53 when side surface 4 at the main cutting edge 53 side faces rightward and side surface 4 at the flat cutting edge 52 side faces downward.

A distance L2 represents a distance between flat cutting edge 52 and the end of level difference portion 11d at the main cutting edge 53 side. Distance L2 is preferably less than or equal to 0.5 time as large as distance L1. Distance L2 is more preferably less than or equal to 0.3 time as large as distance L1.

Figure 4:
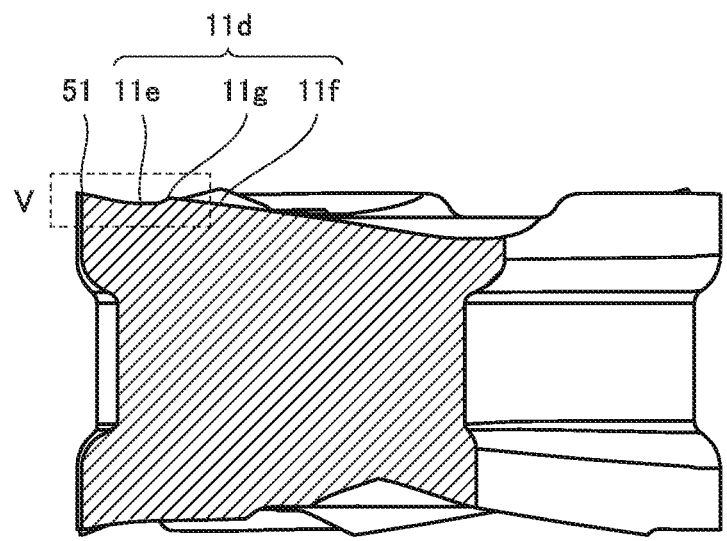
FIG. 4 is a cross sectional view along a IV-IV cross section of FIG. 3.
Figure 5:
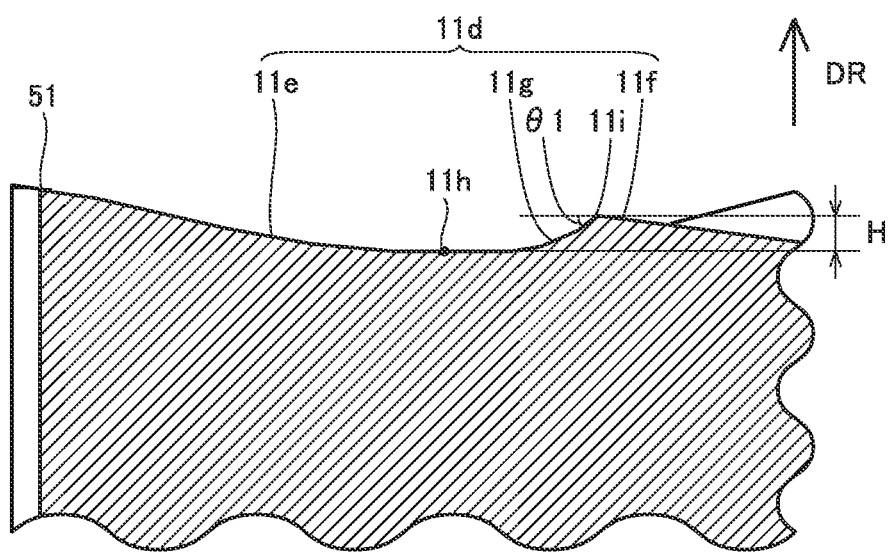
FIG. 5 is an enlarged view of a region V of FIG. 4.

FIG. 4 is a cross sectional view along a IV-IV cross section of FIG. 3. It should be noted that the IV-IV cross section is a cross section that extends through a middle point between first end portion C1 and second end portion C2 in the direction parallel to flat cutting edge 52 and that is parallel to main cutting edge 53. FIG. 5 is an enlarged view of a region V of FIG. 4. As shown in FIG. 4 and FIG. 5, level difference portion 11d is defined by a first region 11e, a second region 11f, and a rising surface 11g. First region 11e is adjacent to rising surface 11g at a side close to corner cutting edge 51. Second region 11f is adjacent to rising surface 11g at a side far from corner cutting edge 51. Rising surface 11g rises from first region 11e and is continuous to second region 11f.

First region 11e may be included in third rake face portion 11c. When first region 11e is included in third rake face portion 11c, rising surface 11g may be included in third rake face portion 11c or may be disposed to range over third rake face portion 11c and second rake face portion 11b.

It should be noted that when first region 11e is included in third rake face portion 11c and rising surface 11g is included in third rake face portion 11c, second region 11f is disposed to range over third rake face portion 11c and second rake face portion 11b. Moreover, when first region 11e is included in third rake face portion 11c and rising surface 11g is disposed to range over third rake face portion 11c and second rake face portion 11b, second region 11f is included in second rake face portion 11b.

First region 11e may be disposed to range over third rake face portion 11c and second rake face portion 11b. When first region 11e is disposed to range over third rake face portion 11c and second rake face portion 11b, second region 11f and rising surface 11g are included in second rake face portion 11b. In short, first region 11e, second region 11f, and rising surface 11g may be disposed such that level difference portion 11d is provided at second rake face portion 11b or third rake face portion 11c.

First region 11e extends to have a lower height in a direction DR perpendicular to seat face 12, as first region 11e is further away from corner cutting edge 51. Rising surface 11g extends to have a higher height in direction DR perpendicular to seat face 12, as rising surface 11g is further away from corner cutting edge 51. Second region 11f extends to have a lower height in direction DR perpendicular to seat face 12, as second region 11f is further away from corner cutting edge 51.

In the cross section extending through middle point MP and parallel to main cutting edge 53, height H of level difference portion 11d in direction DR perpendicular to seat face 12 is more than or equal to 0.04 mm and less than or equal to 0.5 mm, for example. Height H of level difference portion 11d is a distance between a lowest position 11h in first region 11e in direction DR perpendicular to seat face 12 and a boundary portion 11i between rising surface 11g and second region 11f. An inclination angle θ1 of rising surface 11g relative to a plane parallel to seat face 12 is more than or equal to 10° and less than or equal to 60°, for example.

Figure 6:
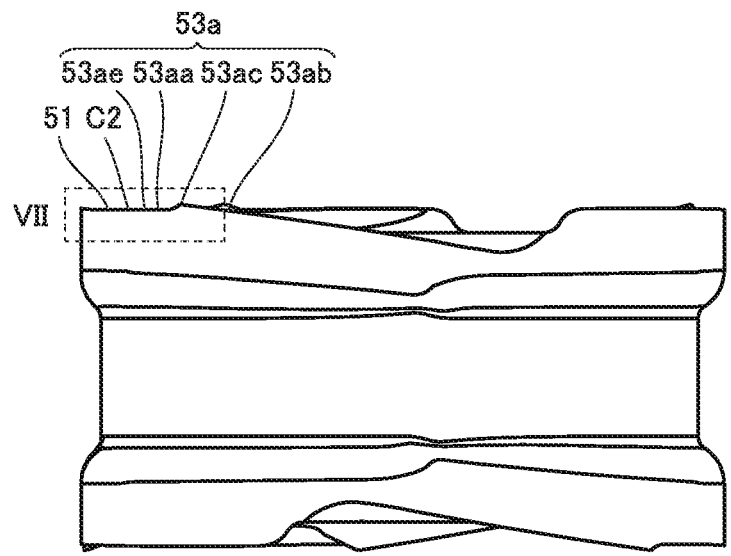
FIG. 6 is a side view when viewed in a direction VI of FIG. 3.
Figure 7:
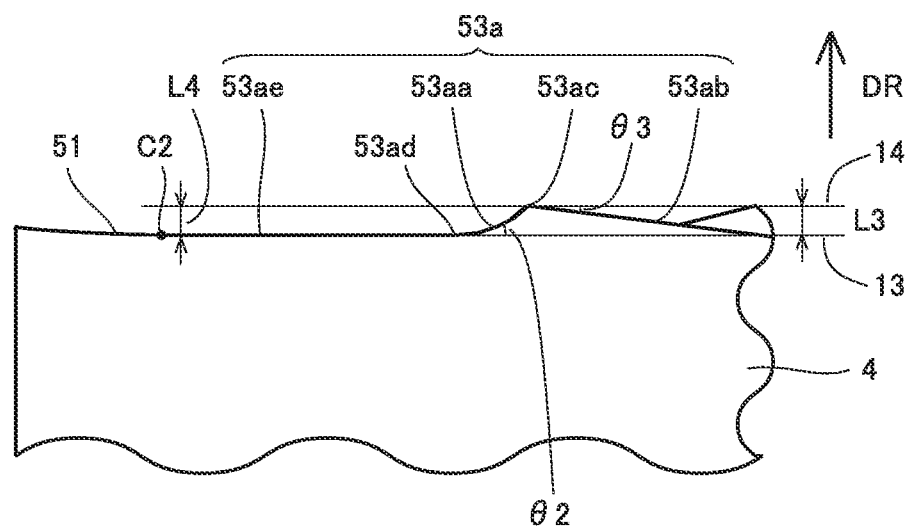
FIG. 7 is an enlarged view of a region VII.

FIG. 6 is a side view when viewed from a direction VI of FIG. 3. It should be noted that direction VI is a direction orthogonal to side surface 4 continuous to main cutting edge 53. FIG. 7 is an enlarged view of a region VII. First portion 53a has a first main cutting edge portion 53aa, a second main cutting edge portion 53ab, and a third main cutting edge portion 53ae. Third main cutting edge portion 53ae is located at the corner cutting edge 51 side relative to first main cutting edge portion 53aa and second main cutting edge portion 53ab, and first main cutting edge portion 53aa is located at the corner cutting edge 51 side relative to second main cutting edge portion 53ab. Third main cutting edge portion 53ae is continuous to first main cutting edge portion 53aa at a first boundary portion 53ad. First main cutting edge portion 53aa is continuous to second main cutting edge portion 53ab at a second boundary portion 53ac. First main cutting edge portion 53aa rises from first boundary portion 53ad toward second boundary portion 53ac.

When viewed in the direction perpendicular to side surface 4 continuous to main cutting edge 53, an inclination angle θ2 of first main cutting edge portion 53aa relative to a straight line 13 parallel to seat face 12 is larger than an inclination angle θ3 of second main cutting edge portion 53ab relative to a straight line 14 parallel to seat face 12. In other words, when viewed in the direction perpendicular to side surface 4 continuous to main cutting edge 53, first portion 53a has an inflection point at which the inclination thereof is changed. Second boundary portion 53ac between first main cutting edge portion 53aa and second main cutting edge portion 53ab serves as the inflection point. Inclination angle θ2 is an angle formed by a straight line connecting second boundary portion 53ac to first boundary portion 53ad and straight line 13 parallel to seat face 12. Inclination angle θ2 may be more than or equal to 5° and less than or equal to 80°, or may be more than or equal to 30° and less than or equal to 55°, for example. Inclination angle θ3 may be more than 0° and less than or equal to 60° or may be more than or equal to 5° and less than 30°, for example. Second main cutting edge portion 53ab extends to have a lower height in direction DR as second main cutting edge portion 53ab is further away from second boundary portion 53ac. In direction DR, a distance L3 between second boundary portion 53ac and first boundary portion 53ad is more than or equal to 0.02 mm and less than or equal to 1.0 mm, for example.

When viewed in the direction perpendicular to side surface 4 continuous to main cutting edge 53, second end portion C2 has a height lower than that of second boundary portion 53ac. In direction DR, a distance L4 between second boundary portion 53ac and second end portion C2 is more than or equal to 0.02 mm and less than or equal to 1.0 mm, for example.

It should be noted that when level difference portion 11d does not cross main cutting edge 53, main cutting edge 53 does not have an inflection point and has a flat shape.

The following describes an overview of cutting employing cutting insert 100 according to the first embodiment.

Figure 8:
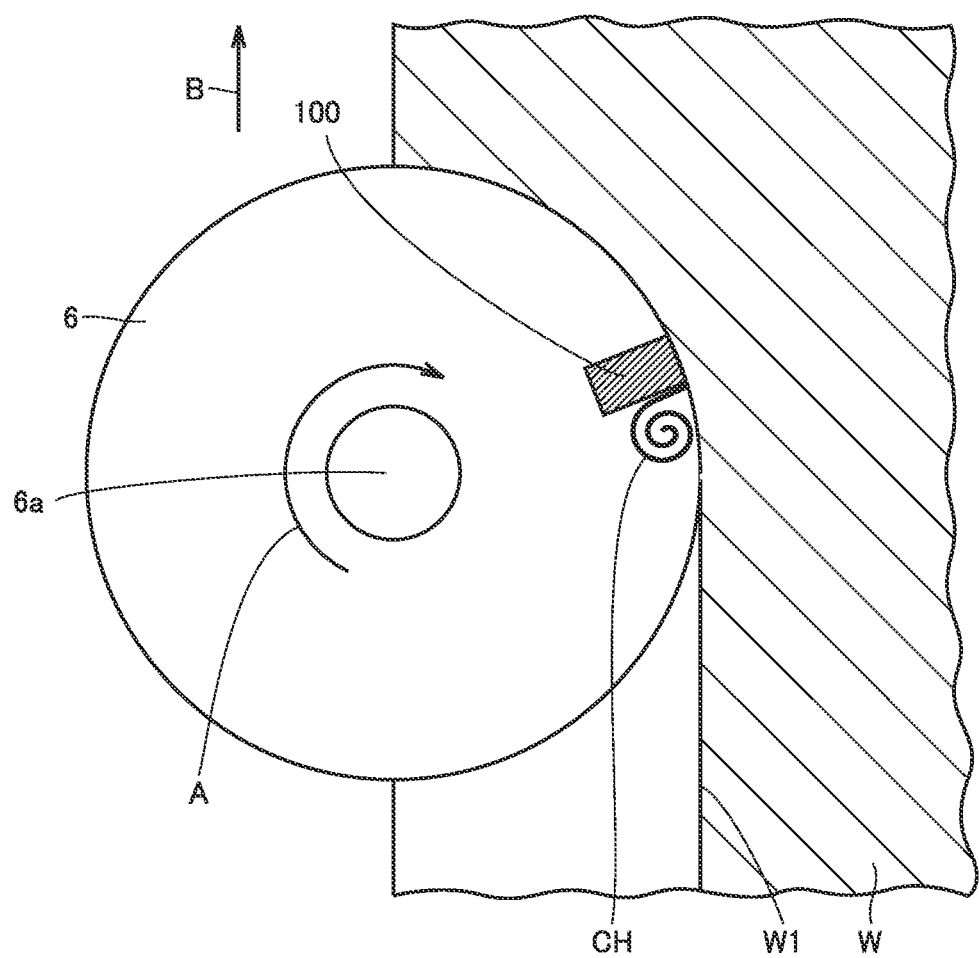
FIG. 8 is a schematic view showing cutting employing the cutting insert according to the first embodiment.

FIG. 8 is a schematic view showing the cutting employing the cutting insert according to the first embodiment. As shown in FIG. 8, cutting insert 100 according to the first embodiment is attached to a milling cutter body 6, for example. When attaching cutting insert 100 according to the first embodiment to milling cutter body 6, cutting insert 100 is positioned by bringing milling cutter body 6 and seat face 12 into contact with each other.

Milling cutter body 6 is rotated around a center axis 6a in a rotation direction A. Accordingly, cutting insert 100 according to the first embodiment attached to milling cutter body 6 is rotated in the same manner. Milling cutter body 6 is moved in a movement direction B while rotating in rotation direction A. Accordingly, rotating cutting edge 5 of cutting insert 100 according to the first embodiment is brought into contact with a workpiece W. As a result, workpiece W is cut, thereby generating swarf CH from workpiece W.

The following describes an effect of cutting insert 100 according to the first embodiment.

Figure 9:
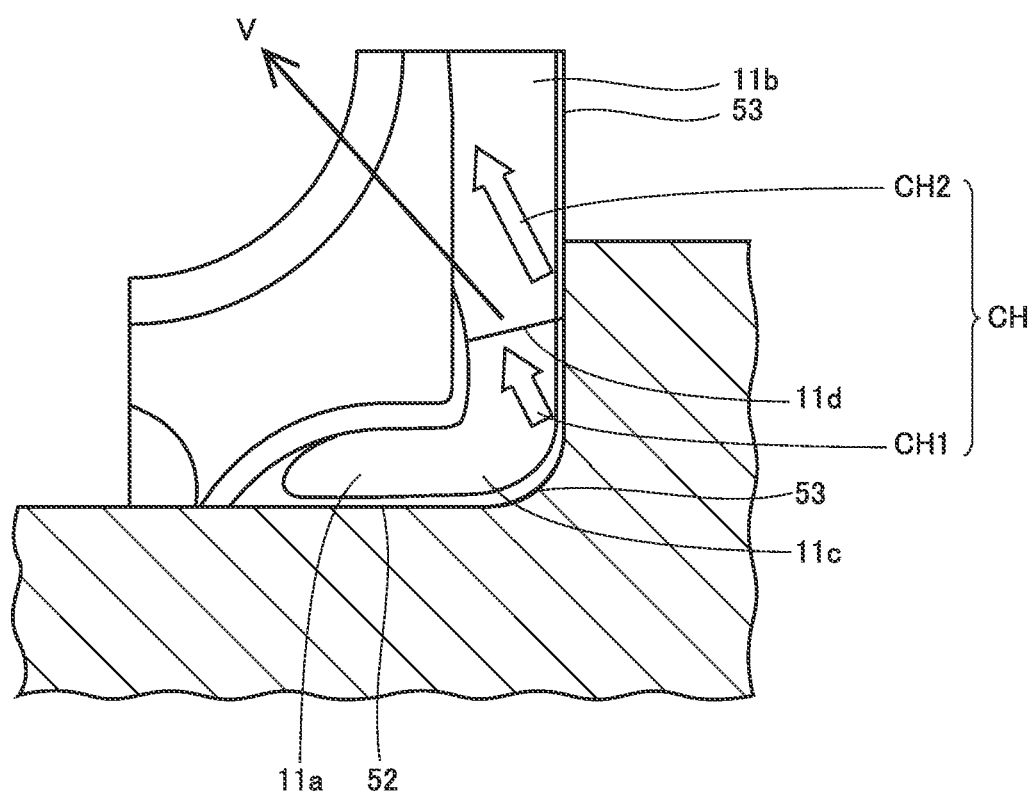
FIG. 9 is a schematic view showing a behavior of swarf in the cutting employing the cutting insert according to the first embodiment.

FIG. 9 is a schematic view showing a behavior of the swarf in the cutting employing the cutting insert according to the first embodiment. As shown in FIG. 9, in the cutting employing cutting insert 100 according to the first embodiment, swarf CH generated from workpiece W is let out with swarf CH being inclined in the upward direction (direction orthogonal to flat cutting edge 52 and further away from flat cutting edge 52) on rake face 11 (second rake face portion 11b and third rake face portion 11c).

Rake face 11 of cutting insert 100 according to the first embodiment has level difference portion 11d. Rake face 11 rises at level difference portion 11d. Therefore, corner cutting edge 51 located below level difference portion 11d or swarf CH1 cut out by main cutting edge 53 are brought into contact with level difference portion 11d. This results in a decreased outlet velocity of swarf CH1 cut out by corner cutting edge 51 or main cutting edge 53 located below level difference portion 11d (in the direction orthogonal to flat cutting edge 52 and approaching to flat cutting edge 52).

On the other hand, swarf CH2 cut out by corner cutting edge 51 or main cutting edge 53 located above level difference portion 11d is not brought into contact with level difference portion 11d. Therefore, the outlet velocity of swarf CH2 cut out by corner cutting edge 51 or main cutting edge 53 located above level difference portion 11d is not decreased by level difference portion 11d.

As such, the outlet velocity of swarf CH2 cut out by corner cutting edge 51 or main cutting edge 53 located above level difference portion 11d becomes faster than the outlet velocity of swarf CH1 cut out by corner cutting edge 51 or main cutting edge 53 located below level difference portion 11d. Therefore, the outlet direction of swarf CH becomes direction V.

Direction V is inclined to be further away from processed surface W1 of workpiece W. Therefore, according to the cutting employing cutting insert 100 according to the first embodiment, occurrence of scratch mark in processed surface W1 due to contact of swarf CH is suppressed.

In cutting insert 100 according to the first embodiment, when level difference portion 11d crosses main cutting edge 53, swarf CH is more likely to be brought into contact with level difference portion 11d. Accordingly, in this case, direction V is more likely to be inclined to be further away from processed surface W1, thereby further suppressing the occurrence of scratch mark in processed surface W1 due to contact of swarf CH.

In cutting insert 100 according to the first embodiment, when level difference portion 11d does not cross main cutting edge 53, main cutting edge 53 has a flat shape. Accordingly, roughness of processed surface W1 can be suppressed in this case.

In cutting insert 100 according to the first embodiment, when angle θ is more than or equal to 1° and less than or equal to 90°, an angle between the direction in which swarf CH1 is let out and the extending direction of level difference portion 11d becomes larger, with the result that resistance resulting from contact with level difference portion 11d becomes large. Accordingly, in this case, the outlet velocity of swarf CH1 cut out from corner cutting edge 51 or main cutting edge 53 located below level difference portion 11d is decreased more greatly. As a result, direction V is more likely to be inclined to be further away from processed surface W1, thereby further suppressing the occurrence of scratch mark in processed surface W1 due to contact of swarf CH.

In cutting insert 100 according to the first embodiment, when distance L2 is more than 0.5 time as large as distance L1, there may be generated swarf CH1 that is cut out from corner cutting edge 51 or main cutting edge 53 located below level difference portion 11d and that is not in contact with level difference portion 11d. As a result, a portion of swarf CH decreased in outlet velocity is sandwiched by a portion of swarf CH not decreased in outlet velocity, with the result that direction V may be instable.

On the other hand, in cutting insert 100 according to the first embodiment, when distance L2 is less than or equal to 0.5 time as large as distance L1, there is decreased swarf CH1 that is not in contact with level difference portion 11d cut out from corner cutting edge 51 or main cutting edge 53 located below level difference portion 11d. Accordingly, direction V becomes unlikely to be instable, thereby further suppressing the occurrence of scratch mark in processed surface W1 due to contact of swarf CH.

Second Embodiment

The following describes a configuration of a cutting insert 200 according to a second embodiment. In the description below, a difference from cutting insert 100 according to the first embodiment will be mainly described and the same explanation will not be repeated.

Figure 10:
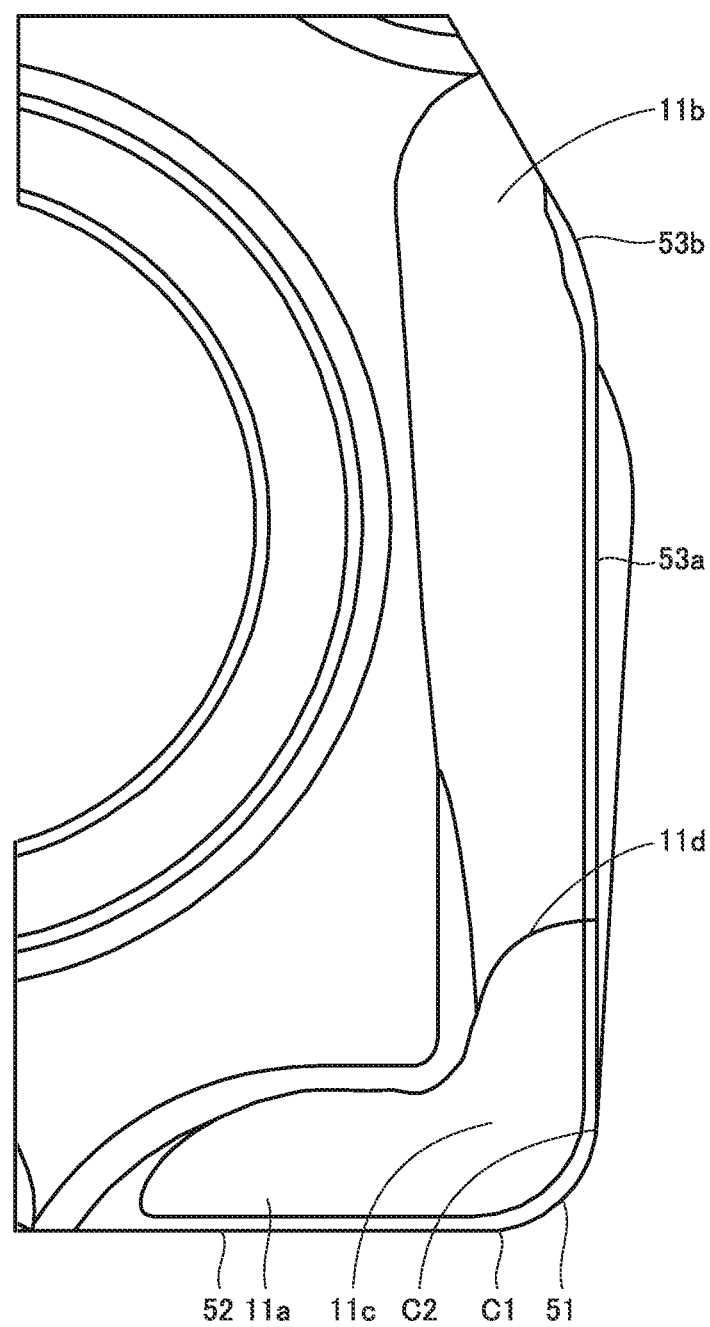
FIG. 10 is an enlarged plan view of a cutting insert according to a second embodiment.
Figure 11:
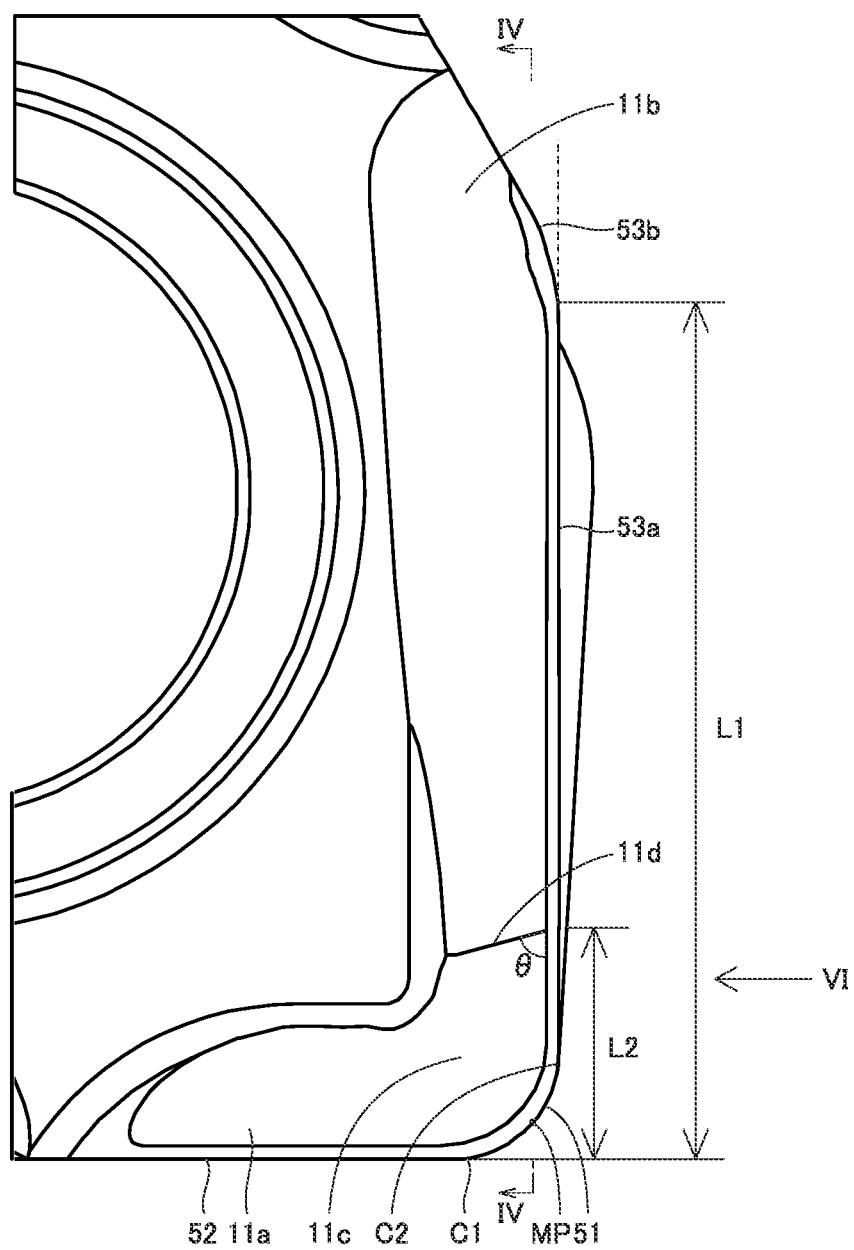
FIG. 11 is another example of an enlarged plan view of a region III of FIG. 2.

FIG. 10 is an enlarged plan view of the cutting insert according to the second embodiment. As shown in FIG. 10, as with rake face 11 of cutting insert 100 according to the first embodiment, rake face 11 of cutting insert 200 according to the second embodiment is provided with level difference portion 11d.

Unlike level difference portion 11d in cutting insert 100 according to the first embodiment, level difference portion 11d in cutting insert 200 according to the second embodiment is formed to have an arch shape when viewed in a plan view. From another viewpoint, this can be expressed as follows: level difference portion 11d in cutting insert 200 according to the second embodiment is curved such that an angle between the extending direction of level difference portion 11d and the extending direction of main cutting edge 53 becomes smaller as level difference portion 11d is further away from main cutting edge 53.

It should be noted that the other points of cutting insert 200 according to the second embodiment are the same as those of cutting insert 100 according to the first embodiment.

In cutting insert 200 according to the second embodiment, since level difference portion 11d is provided to have an arch shape when viewed in a plan view, swarf CH1 cut out from corner cutting edge 51 or main cutting edge 53 located below level difference portion 11d is more likely to be brought into contact with level difference portion 11d. Accordingly, according to cutting insert 200 according to the second embodiment, direction V is more likely to be inclined to be further away from processed surface W1, thereby further suppressing the occurrence of scratch mark in processed surface W1 due to contact of swarf CH.

The embodiments disclosed herein are illustrative and non-restrictive in any respect. The scope of the present disclosure is defined by the terms of the claims, rather than the embodiments described above, and is intended to include any modifications within the scope and meaning equivalent to the terms of the claims.

REFERENCE SIGNS LIST

1: first surface; 11: rake face; 11a: first rake face portion; 11b: second rake face portion; 11c: third rake face portion; 11d: level difference portion; 11e: first region; 11f: second region; 11g: rising surface; 11h: lowest position; 11i: boundary portion; 12: seat face; 13, 14: straight line; 2: second surface; 3: through hole; 4: side surface; 5: cutting edge; 51: corner cutting edge; 52: flat cutting edge; 53: main cutting edge; 53a: first portion; 53aa: first main cutting edge portion; 53ab: second main cutting edge portion; 53ac: second boundary portion; 53ad: first boundary portion; 53ae: third main cutting edge portion; 53b: second portion; 6: milling cutter body; 100, 200: cutting insert; 6a: center axis; A: rotation direction; B: movement direction; C1: first end portion; C2: second end portion; CH, CH1, CH2: swarf; DR: direction; H: height; L1, L2, L3: distance; MP: middle point; V: direction; W: workpiece; W1: processed surface; θ: angle; θ1, θ2, θ3: inclination angle.

The invention claimed is:

1. A cutting insert comprising:
a first surface;
a second surface opposite to the first surface;
a side surface continuous to both the first surface and the second surface; and
a cutting edge constituted of a ridgeline between the first surface and the side surface,
the first surface having a rake face continuous to the cutting edge,
the cutting edge having a corner cutting edge, a flat cutting edge continuous to a first end portion of the corner cutting edge, and a main cutting edge continuous to a second end portion of the corner cutting edge opposite to the first end portion of the corner cutting edge,
the rake face having a first rake face portion, a second rake face portion, and a third rake face portion, the first rake face portion being continuous to the flat cutting edge, the second rake face portion being continuous to the main cutting edge, the third rake face portion being continuous to the corner cutting edge and being located between the first rake face portion and the second rake face portion,
the rake face being provided with a level difference portion at the second rake face portion or the third rake face portion, the level difference portion in a top view crossing the second rake face portion or the third rake face portion and extending in a direction towards the main cutting edge,
the level difference portion being constituted of a rising surface, a first region, and a second region, the first region being adjacent to the rising surface at a side close to the corner cutting edge, the second region being adjacent to the rising surface at a side far from the corner cutting edge,
the rising surface rising from the first region and being continuous to the second region,
the main cutting edge including a first main cutting edge portion, a second main cutting edge portion, and a third main cutting edge portion continuous to the corner cutting edge,
the first main cutting edge portion being continuous to the third main cutting edge portion at a first boundary portion, the first main cutting edge portion rising from the first boundary portion and being continuous to the second main cutting edge portion at a second boundary portion.

2. The cutting insert according to claim 1, wherein when viewed in a direction perpendicular to the side surface continuous to the main cutting edge, the second end portion has a height lower than a height of the second boundary portion.

3. The cutting insert according to claim 1, wherein the level difference portion crosses the main cutting edge.

4. The cutting insert according to claim 1, wherein the level difference portion does not cross the main cutting edge.

5. The cutting insert according to claim 1, wherein an angle formed by an extending direction of the main cutting edge and an extending direction of the level difference portion is more than or equal to 1° and less than or equal to 90° when viewed in a plan view.

6. The cutting insert according to claim 1, wherein
the main cutting edge includes a first portion located at the second end portion side and a second portion located opposite to the second end portion, the second portion being curved to be further away from an extension line of the first portion as the second portion is further away from the first portion, and
a distance between the flat cutting edge and the level difference portion is less than or equal to 0.5 time as large as a distance between the flat cutting edge and an end of the first portion at the second portion side.

* * * * *